(12) United States Patent
Rometsch

(10) Patent No.: US 8,843,341 B2
(45) Date of Patent: Sep. 23, 2014

(54) METHOD AND DEVICE FOR IDENTIFYING A FAULTY ALGORITHM

(75) Inventor: Frank Rometsch, Offenhausen (DE)

(73) Assignee: Siemens Aktiengesellschaft, Munich (DE)

( * ) Notice: Subject to any disclaimer, the term of this patent is extended or adjusted under 35 U.S.C. 154(b) by 461 days.

(21) Appl. No.: 13/148,083

(22) PCT Filed: Nov. 24, 2009

(86) PCT No.: PCT/EP2009/065713
§ 371 (c)(1),
(2), (4) Date: Aug. 5, 2011

(87) PCT Pub. No.: WO2010/088976
PCT Pub. Date: Aug. 12, 2010

(65) Prior Publication Data
US 2011/0295542 A1  Dec. 1, 2011

(30) Foreign Application Priority Data
Feb. 5, 2009 (DE) .......................... 10 2009 007 509

(51) Int. Cl.
*G01D 3/00* (2006.01)
*G06F 11/36* (2006.01)

(52) U.S. Cl.
CPC ........ *G06F 11/3688* (2013.01); *G06F 11/3692* (2013.01)
USPC .......................................... 702/108; 702/123

(58) Field of Classification Search
USPC .................. 717/131; 712/1; 702/108, 123
See application file for complete search history.

(56) References Cited

U.S. PATENT DOCUMENTS

| 4,284,847 | A * | 8/1981 | Besserman ..................... 73/585 |
| 8,265,100 | B2 * | 9/2012 | Steiner et al. ................. 370/503 |
| 2009/0007078 | A1 | 1/2009 | Hoyek et al. ............. G06F 9/44 |
| 2010/0023928 | A1 | 1/2010 | Hentschel et al. ........ G06F 9/44 |

FOREIGN PATENT DOCUMENTS

| DE | 102006046203 A1 | 8/2007 | ............. G06F 11/00 |
| WO | 2007/146558 A2 | 12/2007 | |
| WO | 2010/088976 A1 | 8/2010 | ............ G05B 23/02 |

OTHER PUBLICATIONS

International Search Report and Written Opinion for Application No. PCT/EP2009/065713 (10 pages), Mar. 12, 2010.

* cited by examiner

*Primary Examiner* — Elias Desta
(74) *Attorney, Agent, or Firm* — King & Spalding L.L.P.

(57) ABSTRACT

In a method and to a device for identifying an erroneous algorithm (A), data output by a1) of the algorithm (A) to be tested and/or a2) a reference algorithm (B) are categorized, and the reference frequency (R(A), R(B)) at which data of at least one category (Kx) occur during operation for the case a1) of the algorithm (A) to be tested or for case a2) of the reference algorithm (B) is determined in a reference phase. The test frequency (T(A)) at which data of at least one category (Kx) occur during operation of the algorithm (A) to be tested is determined in a test phase. Finally, an error message is output if the deviation of the test frequency (T(A)) of at least one category (Kx) from the reference frequency (R(A), R(B)) of the same category (Kx) exceeds a specific threshold value (THR).

16 Claims, 1 Drawing Sheet

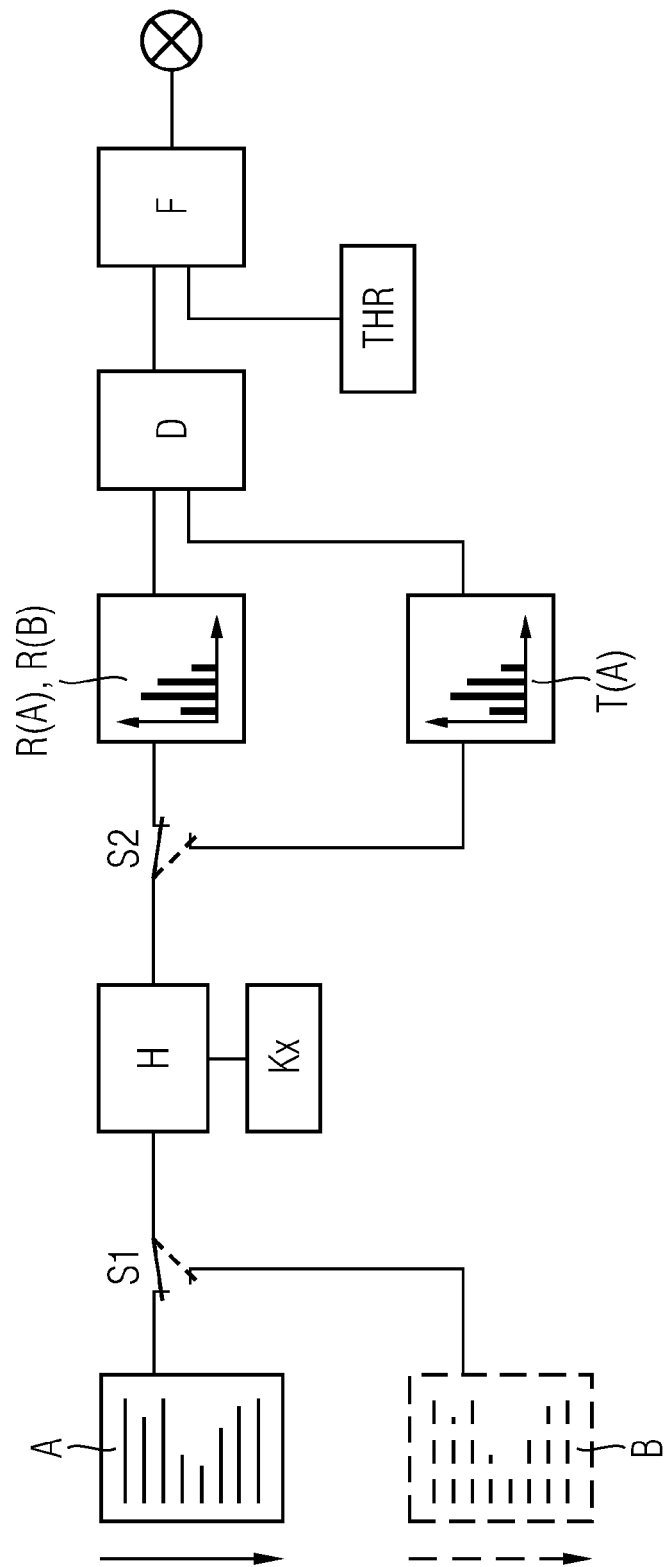

_(1)_

METHOD AND DEVICE FOR IDENTIFYING A FAULTY ALGORITHM

CROSS-REFERENCE TO RELATED APPLICATIONS

This application is a U.S. National Stage Application of International Application No. PCT/EP2009/065713 filed Nov. 24, 2009, which designates the United States of America, and claims priority to German Application No. 10 2009 007 509.7 filed Feb. 5, 2009, the contents of which are hereby incorporated by reference in their entirety.

TECHNICAL FIELD

The invention relates to a method for identifying a faulty algorithm. The invention relates further to a device for implementing the inventive method.

BACKGROUND

Algorithms, explained in the following using software as a representative instance, are pervading numerous areas of our daily life. For example many people's professional occupations are linked to working with a PC. But software is nowadays also to be found in many—if not almost all—devices. The range extends from the private domain where, say, the mobile telephone, television set, satellite receiver, and suchlike are equipped with software, through to the public sector—here, for example, traffic-guidance systems, and on to the industrial sector where large technical systems are controlled by software.

Ever shorter development cycles are unfortunately compelling the manufacturers of software to release it onto the market even though it has not yet been adequately tested. We are therefore often confronted with devices which do not work or work improperly. Software errors cannot, though, be totally excluded even when extensive tests are carried out. A number of strategies have therefore been developed that enable efficient detecting of errors in algorithms.

Systems are therein monitored during operation to check the state of their health along with their performance, with many different performance parameters being evaluated that can be roughly subdivided into "software-application", "operating-system", and "hardware" domains. For example CPU capacity utilization, network capacity utilization, memory usage, hard-disk activity, and much else besides—for observing all of which the operating systems often already include suitable tools—can provide information about how correctly an algorithm is running. If a specific software application is to be monitored, for example the data fed out by the application can be monitored. Such data is often available in the form of what are termed "log files" in which the events relating to the application's operation are logged, thus providing a valuable basis for trouble-shooting.

The log files mostly have to be evaluated manually by software specialists. That is very time-consuming and costly because said log files are usually very long and full of information that documents the normal and also fault-free program flow, meaning it does not point up any errors in the actual sense. Support is therefore available in the form of what are termed "evaluation scripts" or "post-processors" that structure the information set. A search is for that purpose conducted in the log files for certain keywords at whose locations potential problems in the software are suspected. Instances thereof would be terms such as "Warning", "Error", "Abort", and "Exception". For example lines in the log file that contain certain keywords will be marked in color. As already mentioned, supplied software is frequently unable to satisfy even minimum quality criteria so that even the tools that are available cannot stem the flood of information sufficiently to enable software specialists to perform efficient trouble-shooting. That is because they are as a rule confronted with a quantity of what are termed "false positive hits". "False positive" is a termed used for test results which indicate that a test criterion has been met although it has in fact not been met at all. The log files therefore contain a quantity of "error messages" which, though, an experienced software expert would class as posing no hazard or being of no interest since they are produced during the normal program flow.

The problems addressed do not, of course, relate exclusively to algorithms in software form. Rather it is the case that an algorithm can be embodied also in hardware form or a form that combines software and hardware. What has been said thus applies analogously to those categories also.

SUMMARY

According to various embodiments, an improved method and an improved device can be disclosed for identifying a faulty algorithm.

According to an embodiment, a method for identifying a faulty algorithm may include the steps:
a) Categorizing data that is fed out by a1) the algorithm requiring to be tested and/or by a2) a reference algorithm,
b) determining the reference frequency with which data belonging to at least one category arises while in case a1) the algorithm requiring to be tested or in case a2) the reference algorithm is operating,
c) determining the test frequency with which data belonging to at least one category arises while the algorithm requiring to be tested is operating,
d) determining the difference between the test frequency belonging to at least one category and the reference frequency belonging to the same category, and
e) feeding out an error message if the difference exceeds a specific threshold.

According to a further embodiment, at step c) a category can be used that does not correspond to any of the categories employed at step b). According to a further embodiment, all categories from step b) can be used at step c). According to a further embodiment, the operation, in case a1), of the algorithm requiring to be tested or, in case a2), of the reference algorithm can be monitored at step b). According to a further embodiment, the reference frequency can be determined at step b) with the aid of several instances, in case a1), of the algorithm requiring to be tested or, in case a2), of the reference algorithm. According to a further embodiment, the test frequency can be determined at step c) with the aid of several instances of the algorithm requiring to be tested. According to a further embodiment, the average value of the several instances can be used as the reference frequency or, as the case may be, test frequency. According to a further embodiment, step b) and/or step c) can be performed when, in case a1), the algorithm requiring to be tested or, in case a2), the reference algorithm is not operating. According to a further embodiment, the categories for step a) can be ascertained automatically using the received data.

According to another embodiment, a device for identifying a faulty algorithm, may comprise: a) Means for categorizing data that is fed out by a1) the algorithm requiring to be tested and/or by a2) a reference algorithm, b) means for determining the reference frequency with which data belonging to at least one category arises while in case a1) the algorithm requiring to be tested or in case a2) the reference algorithm is operating, c) means for determining the test frequency with which data belonging to at least one category arises while the algorithm requiring to be tested is operating, d) means for determining the difference between the test frequency belonging to one category and the reference frequency belonging to the same category, and e) means for feeding out an error message if the difference exceeds a specific threshold.

BRIEF DESCRIPTION OF THE DRAWINGS

The present invention will now be explained in more detail with the aid of the exemplary embodiments shown in the schematic in the drawing:

FIG. 1 shows the flow of the method according to various embodiments as a functional representation;

Unless indicated otherwise, elements and features in the FIGURE that are the same and functionally identical have been assigned the same reference letters and different indices.

DETAILED DESCRIPTION

A method for identifying a faulty algorithm accordingly includes the steps:
a) Categorizing data that is fed out by a1) the algorithm requiring to be tested and/or by a2) a reference algorithm,
b) determining the reference frequency with which data belonging to at least one category arises while in case a1) the algorithm requiring to be tested or in case a2) the reference algorithm is operating,
c) determining the test frequency with which data belonging to at least one category arises while the algorithm requiring to be tested is operating,
d) determining the difference between the test frequency belonging to at least one category and the reference frequency belonging to the same category, and
e) feeding out an error message if the difference exceeds a specific threshold.

A device for identifying a faulty algorithm accordingly includes:
a) Means for categorizing data that is fed out by a1) the algorithm requiring to be tested and/or by a2) a reference algorithm,
b) means for determining the reference frequency with which data belonging to at least one category arises while in case a1) the algorithm requiring to be tested or in case a2) the reference algorithm is operating,
c) means for determining the test frequency with which data belonging to at least one category arises while the algorithm requiring to be tested is operating,
d) means for determining the difference between the test frequency belonging to at least one category and the reference frequency belonging to the same category, and
e) means for feeding out an error message if the difference exceeds a specific threshold.

The various embodiments enable faulty algorithms to be identified particularly efficiently because checking takes place at a high level of abstraction. It is not the individual error message that is of significance here but the algorithm's macroscopic impact. A faulty algorithm is therein identified with the aid of statistical approaches. It is particularly advantageous that this method is able to operate with no human involvement whatsoever. "False positive errors" are also advantageously suppressed because the unusual fault entries can nonetheless be distinguished from the customary ones even if the software is not working perfectly. The actual quantity of suspect entries can thus be further reduced in size as compared with deterministic approaches according to the prior art, which will make faster analysis possible. Errors can furthermore be detected promptly. If the algorithm runs in a slightly altered way, if expected data/messages fail(s) to appear, or if new data/messages is/are added, that can indicate an impending problem even before the software actually issues messages itself such as "Warning" or "Error", for instance. The statistical evaluation is not, moreover, dependent on the developer's establishing specific error classifications. Usually, of course, the person developing the software and/or hardware has to predict errors and handle them by structuring the software and/or hardware appropriately, which means feeding out an error message. It is in the nature of things that the developer cannot foresee every eventuality because errors could then, of course, be avoided in general. If, however, the unforeseen happens, that will generally impact on the data that is fed out even if no dedicated error message is provided. That means that even if certain situations are not recognized by the program's logic as being errors, irregularities in, for example, a specific section of the log file can be used to classify it as suspect. The method according to various embodiments is finally independent of the number of simultaneous users. A user who performs a certain procedure in a software system will produce a certain quantity of data outputs or, as the case may be, log-file entries in doing so. The number of log-file entries is naturally multiplied by the number of users working in the system simultaneously. With the prior art, the effort involved in trouble-shooting therefore increases more or less in proportion with the number of users in the system. That is further exacerbated by the fact that the error messages or entries are not separated according to users but are arranged chronologically and so present a motley profusion as far as individual users are concerned. Nor is it possible, moreover, to assign every output of an application to a specific user because there are as a rule also generalized error messages. The effort involved in applying the method according to various embodiments increases by contrast either not at all or only marginally because the relative frequency of specific messages is of course not, or only slightly, dependent on the number of users. Providing the users act more or less similarly or, as the case may be, given a sufficiently long observation period, a stable distribution will emerge here. Any change in said stable distribution may be due to an error. The various embodiments therefore makes a significant efficiency increase possible in identifying faulty software.

It is advantageous to use a category at step c) that does not correspond to any of the categories employed at step b). In that variant for example an "intercept category" is provided in which data not fitting into any of the categories employed during the reference phase (step b) is assigned during the test phase (step c). The occurrence of unforeseen errors can be monitored particularly well in that way.

It is favorable for all categories from step b) to be used at step c). According to this embodiment, therefore, no useless data will be stored during the reference phase.

It is also favorable for the operation, in case a1), of the algorithm requiring to be tested or, in case a2), of the reference algorithm to be monitored at step b). The algorithm is here advantageously monitored during the reference phase with the aid of other tools or even manually to ensure that the reference frequency is actually representative of faulty operation by the algorithm.

In an embodiment the reference frequency is determined at step b) with the aid of several instances, in case a1), of the algorithm requiring to be tested or, in case a2), of the reference algorithm. Several instances of the algorithm can also be used to minimize the risk of the reference frequency's not being representative of faulty operation by the algorithm merely because, for example, one user keeps making wrong entries. If, say, a plurality of users are working at different workstations using the same algorithm or program, then the data of all these instances can be combined and the method according to various embodiments applied thereto. Wrong entries made by individual users will then have a much lesser impact.

In another embodiment the test frequency is moreover determined at step c) with the aid of several instances of the algorithm requiring to be tested. What was said in connection with the previous variant here applies analogously, though applied to the test frequency.

It is furthermore advantageous for the average value of the several instances to be used for the reference frequency or, as the case may be, test frequency. That is another way to make the method according to various embodiments robust.

It is also advantageous for step b) and/or step c) to be performed when, in case a1), the algorithm requiring to be tested or, in case a2), the reference algorithm is not operating. The method according to various embodiments can run "offline" in the case of that variant, possibly with the aid of log files. That will be advantageous when a test cannot be performed on site and the cited log files are handed over for test purposes.

It is finally particularly advantageous for the categories for step a) to be ascertained automatically using the received data. According to this embodiment, the data is evaluated during a certain period of time before the reference phase to determine which types of messages are being fed out by an algorithm. Those categories are then used for the ensuing reference phase. If the method according to various embodiments is applied to log files, then one and the same log file can of course serve as the basis for the categories and for the frequency.

Be it noted at this point that the cited variants of the method and the resulting advantages relate also to the device and vice versa.

The above embodiments and developments of the invention can be combined in any way whatsoever.

FIG. 1 is a functional presentation of a device and of the flow of the method according to various embodiments. The elements shown in FIG. 1 do not necessarily constitute real elements in the sense of a physical device but serve primarily to illustrate the function of the invention.

Shown in FIG. 1 are an algorithm A requiring to be tested and an optional reference algorithm B (dashed outline). Shown further in FIG. 1 is a first switch S1 that routes the data either of algorithm A requiring to be tested or of reference algorithm B to means H, which determine the frequency with which data belonging to one category arises while algorithm A requiring to be tested or reference algorithm B is operating. Said means are in the present example embodied as a (software) function having the name "frequency determining". The function makes use of different categories Kx that are to be tested and are stored in a memory, for example. Further shown is a switch S2 that routes the results of the frequency distribution function H either to reference frequency R(A) or to test frequency T(A). The two intermediate results form the input to means D determining the difference between test frequency T(A) belonging to a category Kx and reference frequency T(A) belonging to the same category Kx. Said means are in the present example embodied as a (software) function "delta" D. The resulting difference is finally compared with a threshold THR and, where applicable, an error message is fed out, in this case symbolized by a lamp. The output means are here embodied as a (software) function "error" F.

The function of the arrangement shown in FIG. 1 is now as follows:

The starting point for the observations that follow is a condition in which both switches S1 and S2 are closed, thus having assumed the position shown. Algorithm A requiring to be tested feeds out data while now running (symbolized by an arrow). Algorithm A can be any software program or a circuit implemented in hardware form.

To illustrate the function it is assumed in this example that algorithm A feeds out the messages "Warning", "Error", "Abort", and "Exception". Four categories Kx are thus formed. That data is processed by the frequency H function during a reference phase in which the correct flow of algorithm A is monitored. In the simplest case, counters are provided for each category that are incremented accordingly when a message is received. Thus if, for example, an "Exception" message is received, the counter belonging to the category "Exception" will be incremented by one. There will thus over time be a distribution of reference frequency R(A), which is representative of the correct flow of algorithm A requiring to be tested. Be it noted in this connection that the occurrence of "Error" and "Abort" messages will not perforce cause algorithm A to crash but that it will be able to continue running even after errors have occurred. Distributing can also be normalized to make it independent of the reference phase's duration.

Algorithm A is tested at an ensuing step during a test phase, so while being used in the field, for instance. Switch S2 is for that purpose switched over (dashed-line position); switch S1 remains in the position shown.

As during the reference phase, algorithm A continuously produces data or, as the case may be, messages belonging to the above-mentioned categories Kx also during the test phase. The frequency H function again processes the data and generates a distribution of test frequency T(A), which can in turn also be normalized. If normalizing is not provided, then the duration of the reference phase and test phase should be the same or at least have a known relationship.

These two distributions that have been obtained now form the input for the delta D function that determines the differences between the test frequency T(A) and reference frequency R(A) for each category Kx. That means the frequency of the "Warning" message during the test phase is deducted from said message's frequency during the reference phase. The same is done for "Error", "Abort", and "Exception". An error message will be fed out if one of the ascertained differences is larger than a predefinable threshold THR. Instead of via the lamp shown, that can of course also take place acoustically or by way of an error message on a screen. Different thresholds THX can also be predefinable for the individual categories Kx. A lower threshold, say, can be provided for the category "Error" than for the category "Warning". It can moreover be provided for the absolute value of the difference to be compared with the threshold THR. In that case an error message will be fed out also if, for example, fewer "Warnings" than expected are fed out. It is also conceivable for the mean of all differences or the mean of weighted differences to be compared with the threshold. The examples listed are therein only some of the conceivable possibilities.

A faulty algorithm A can be identified relatively easily in that way and with no human involvement. Individual errors are therein not observed as traditionally happens; instead, statistical patterns are compared. Thus errors are ascertained more on a superficial basis but the process is nonetheless a reliable one. Most especially the system reacts also to unexpected errors. Monitoring has traditionally focused more on errors that were basically expected to occur. It is also advantageous for a further category Kx not corresponding to any of the categories Kx used during the reference phase to be provided during the test phase. The occurrence of unexpected errors can in that way be monitored particularly well.

It will now be shown in a second example how the method according to various embodiments proceeds when there is a reference algorithm B. For that example it is assumed that switch S1 adopts the dashed-line position and switch S2 the position which is shown. The way the method proceeds during the reference phase is analogous to that in the first example, except that the data not of test algorithm A but of reference algorithm B is evaluated. Switch S1 is now switched over during the test phase so that the data of algorithm A will be evaluated. The frequencies are evaluated again analogously to the first example, with the reference frequency of reference algorithm R(B) taking the place of the reference frequency of test algorithm R(A). Thus the main difference compared with the first example is that there are two different algorithms A and B here. Test algorithm A can be, for example, a new, untried development of already stably running reference algorithm B. It is in that way possible also to monitor the running behavior of developments and new algorithms.

Evaluating does not, of course, have to take place while algorithms A and B are operating as normal, meaning it does not have to be "online". It can also take place separately from normal operation, meaning "offline". Many algorithms create what are termed "log files" in which the operation-related events are logged, thus providing a valuable basis for trouble-shooting. Log files of such kind are unfortunately usually very big. Manual trouble-shooting is therefore very time-consuming especially since error messages and warnings are, of course, most definitely produced also during normal operation. The various embodiments can here help to identify log files in which unexpected behavior on the part of algorithm A has been registered. The relevant position within the log file can moreover be localized very precisely if the method according to various embodiments is applied to individual sections of the log file. Software specialists will then be able to resume trouble-shooting in that region selectively by manual means in order to establish the actual problem. The various embodiments will therefore allow trouble-shooting to be significantly more efficient than has been possible hitherto.

Several instances of algorithm A or B can also be used for the method according to various embodiments to minimize the risk of an algorithm A's being identified as faulty merely because, for example, one user keeps making wrong entries. If, say, a plurality of users are working at different workstations using the same algorithm or program, then the data of all these instances can be combined and the method according to various embodiments applied thereto. Wrong entries made by individual users will then have a much lesser impact.

Categories Kx can also be determined automatically to make a faulty algorithm A even easier to identify. The data is for that purpose evaluated during a certain period of time before the reference phase to determine which types of messages are being fed out by algorithm A or B. Those categories are then used for the ensuing reference phase. If the method according to various embodiments is applied to log files, then one and the same log file can of course serve as the basis for categories Kx and for the frequency.

Although the example has in the interest of greater clarity been explained using specific data of algorithms A and B, to a person skilled in the relevant art it will nevertheless be immediately obvious that the various embodiments can also be realized using other data. The invention is by no means limited to error messages or warnings but can also be applied to other types of data, in particular also to useful data. For example the frequency of characters in a file that is the result of an encryption or compression algorithm can serve to identify an error in said algorithm. The method according to various embodiments can equally be applied also to audio or video data.

It is in conclusion again made clear that although the invention has been explained using software it does not relate exclusively to software algorithms. Rather it is the case that the invention can be successfully applied also to algorithms that are implemented in hardware form or have been assembled on a hybrid basis from both software and hardware, especially also since the boundaries between hardware and software are in any event fluid in modern devices.

What is claimed is:

1. A method for identifying a faulty algorithm, comprising:
    a) categorizing messages output by at least one algorithm into a plurality of different output message categories, the at least one algorithm comprising at least one of an algorithm to be tested and a reference algorithm,
    b) during a reference phase, determining by a processor a reference frequency for each of the different output message categories for the algorithm to be tested or reference algorithm, by operating the algorithm to be tested or reference algorithm and counting a reference number of occurrences of each different output message,
    c) during a test phase subsequent to the reference phase, determining by the processor a test frequency for each of the different output message categories for the algorithm to be tested by operating the algorithm to be tested and counting a test number of occurrences of each different output message,
    d) for each of the different output message categories, determining by the processor a difference between the test frequency for that output message category determined during the test phase and the reference frequency for that output message category determined during the reference phase, and
    e) for each of the different output message categories, outputting an error message by the processor if the difference exceeds a predetermined threshold.

2. The method according to claim 1, wherein at step c) an output message category is used that does not correspond to any of the categories employed at step b).

3. The method according to claim 1, wherein all output message categories from step b) are used at step c).

4. The method according to claim 1, wherein the reference frequency is determined at step b) using multiple instances of the algorithm to be tested or reference algorithm.

5. The method according to claim 1, wherein the test frequency is determined at step c) with the aid of multiple instances of the algorithm requiring to be tested.

6. The method according to claim 4, wherein an average value of the multiple instances is used as the reference frequency or the test frequency for each of the different output message categories.

7. The method according to claim 1, wherein the plurality of different output message categories for step a) are ascertained automatically by the processor.

8. A device for identifying a faulty algorithm, comprising:
    a) means for categorizing messages output by at least one algorithm into a plurality of different output message categories, the at least one algorithm comprising at least one of an algorithm to be tested and a reference algorithm, b) means for determining, during a reference phase, a reference frequency for each of the different output message categories for the algorithm to be tested or reference algorithm, by operating the algorithm to be tested or reference algorithm and counting a reference number of occurrences of each different output message, c) means for determining, during a test phase subsequent to the reference phase, a test frequency for each of the different output message categories for the algorithm to be tested by operating the algorithm to be tested and counting a test number of occurrences of each different output message, d) means for determining, for each of the different output message categories, a difference between the test frequency for that output message category determined during the test phase and the reference frequency for that output message category determined during the reference phase, and e) means for outputting an error message for each of the different output message categories if the determined difference for that output message category exceeds a predetermined threshold.

9. The device according to claim 8, wherein the means determining the test frequency use an output message category that does not correspond to any of the categories employed by the means for determining the reference frequency.

10. The device according to claim 8, wherein all output message categories used by the means for determining a reference frequency are used by the means for determining a test frequency.

11. The device according to claim 8, wherein the reference frequency is determined by the means for determining a reference frequency using multiple instances of the algorithm to be tested or reference algorithm.

12. The device according to claim 8, wherein the test frequency is determined by the means for determining a test frequency with the aid of multiple instances of the algorithm requiring to be tested.

13. The device according to claim 11, wherein an average value of the multiple instances is used as the reference frequency or the test frequency for each of the different output message categories.

14. The device according to claim 12, wherein an average value of the multiple instances is used as the reference frequency or the test frequency for each of the different output message categories.

15. The device according to claim 8, wherein the plurality of different output message categories determined by the means for categorizing data are ascertained automatically using received data.

16. The method according to claim 5, wherein an average value of the multiple instances is used as the reference frequency or the test frequency for each of the different output message categories.

* * * * *